No. 712,170.  
W. S. YOUNG.  
GARBAGE CAN.  
(Application filed Oct. 7, 1901.)  
Patented Oct. 28, 1902.
(No Model.)
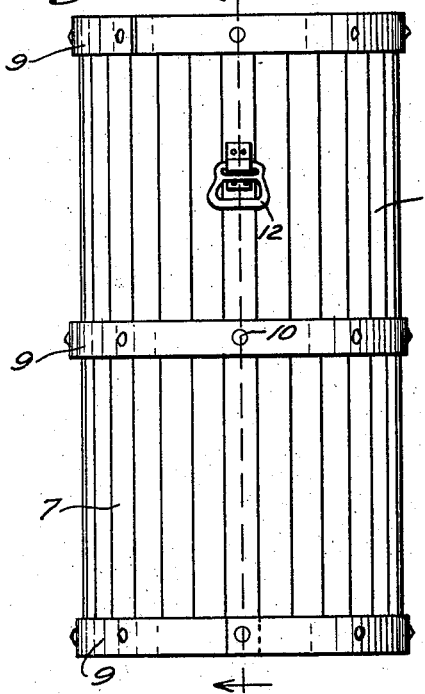
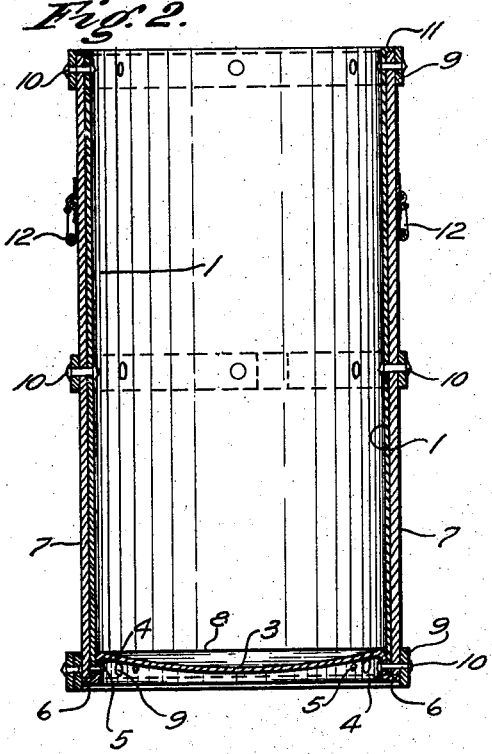
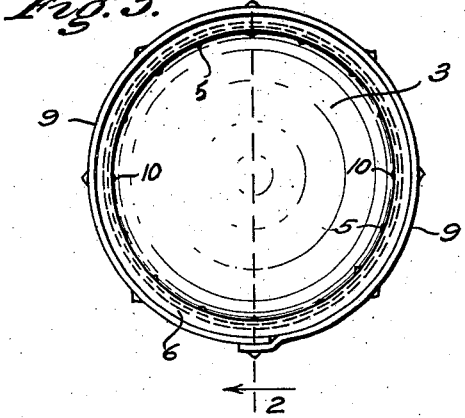
WITNESSES:
INVENTOR,
William S. Young,
BY
Rummler & Rummler
his ATTORNEYS.
THE NORRIS PETERS CO., PHOTO-LITHO., WASHINGTON, D. C.

UNITED STATES PATENT OFFICE.

WILLIAM S. YOUNG, OF CHICAGO, ILLINOIS.

GARBAGE-CAN.

SPECIFICATION forming part of Letters Patent No. 712,170, dated October 28, 1902.

Application filed October 7, 1901. Serial No. 77,855. (No model.)

*To all whom it may concern:*

Be it known that I, WILLIAM S. YOUNG, a citizen of the United States of America, and a resident of Chicago, in the county of Cook and State of Illinois, have invented certain new and useful Improvements in Garbage-Cans, of which the following is a specification.

The main object of my invention is to provide an improved garbage-can having a sheet-metal body surrounded by a stiffening frame or casing, the parts being suitably arranged and connected to withstand the abuse and rough usage to which such a receptacle is ordinarily subjected. I accomplish this object by the device shown in the accompanying drawings, in which—

Figure 1 is a side elevation of a garbage-can constructed according to my invention. Fig. 2 is a vertical section of the same along the line 2 2. Fig. 3 is a bottom plan of same.

The device shown consists of a cylindrical sheet-metal can open at the top and having its vertical sides sheathed with a wooden jacket reinforced by transverse metal bands or hoops.

The cylindrical body 1 is preferably made of a single sheet of metal having its edges joined in a longitudinal seam. The bottom 2 is convex and is stamped or spun to the shape shown in Fig. 2. The bottom is preferably disposed at a considerable distance above the lower edge of the cylindrical body, so that said bottom shall be free from direct contact with the ground. The cylindrical sides 4 of the bottom 3 are securely riveted to the lower end of the body 1 by a series of rivets 5. The edge of the bottom then terminates in an outwardly-projecting flange 6, which embraces the lower end of the body 1 and the sheathing 7. The line of junction 8 between the bottom 3 and the sides of the can is preferably soldered, so as to insure water-tightness. The sheathing 7 is made of a series of narrow strips of wood or staves extending longitudinally of the body 1, fitting closely to the same and closely to each other. The bands 9 are tightly fitted around the outside of the sheathing 7. The ends of the bands 9 are riveted together, so as to form hoops, which are then slipped over the sheathing 7 and secured by a number of rivets 10, which extend entirely through both the sheathing 7 and the walls of the body 1. The upper end 11 of the body 1 is flanged outwardly, so as to cover the upper end of the sheathing 7, said flange being in turn protected by the upper band 9. Two handles 12 are secured at opposite sides of the can near its upper end. The lower band 9 is preferably placed so as to project slightly below the lower end of the body of the can.

It will be seen that some of the details of the device shown may be altered without departing from the spirit of my invention. I therefore do not confine myself to such details except as hereinafter limited in the claim.

What I claim as my invention, and desire to secure by Letters Patent, is—

As an article of manufacture, a garbage-can comprising a cylindrical sheet-metal body open at the top and surrounded by a sheathing consisting of a plurality of wooden staves fitting closely against the outside of the vertical walls of said body and closely against each other, and covering the entire exterior surface of said vertical walls, the ends of said staves being protected by a covering of sheet metal extending from the adjacent parts of the walls of said body, and a metal hoop surrounding said staves and body at each end, each of said hoops being rigidly secured by fastening means passing entirely through the walls of said body and through the adjoining stave, one of said hoops being flush with the upper end of said body, and the other hoop projecting below the lower end of said sheathing.

Signed at Chicago this 18th day of September, 1901.

WILLIAM S. YOUNG.

Witnesses:
WM. R. RUMMLER,
GLEN C. STEPHENS.